3,517,817
LIQUID TREATING APPARATUS
Hans Hitzel, Frankfurt am Main, Germany, assignor to Metallgesellschaft Aktiengesellschaft, Frankfurt am Main, Germany
Filed Aug. 7, 1967, Ser. No. 658,776
Claims priority, application Germany, Feb. 2, 1967, M 72,635; Feb. 18, 1967, M 72,813
Int. Cl. B01d 23/10
U.S. Cl. 210—279       12 Claims

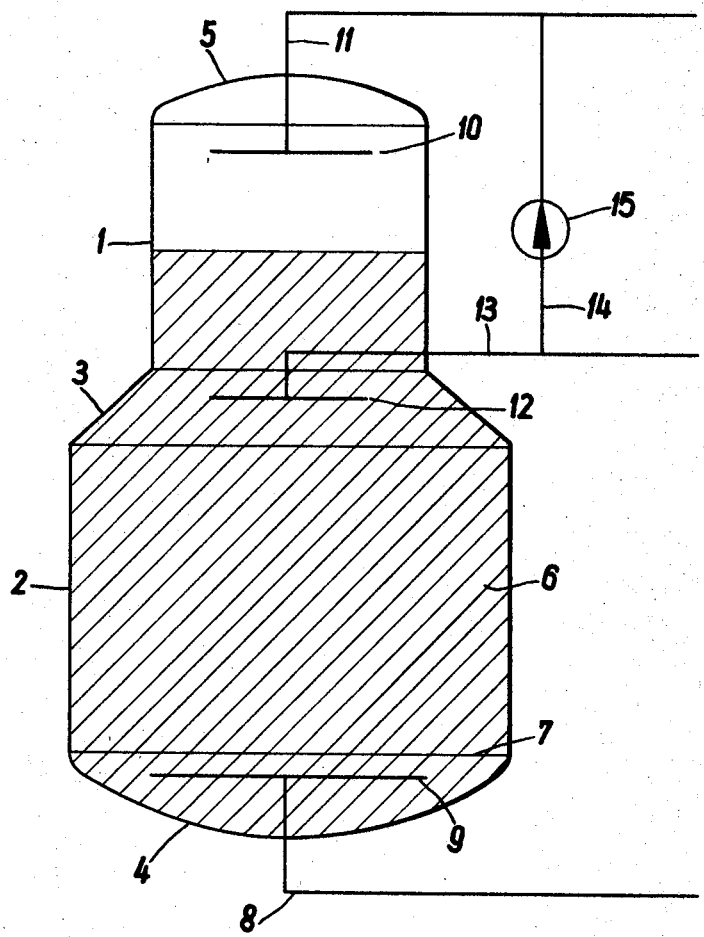

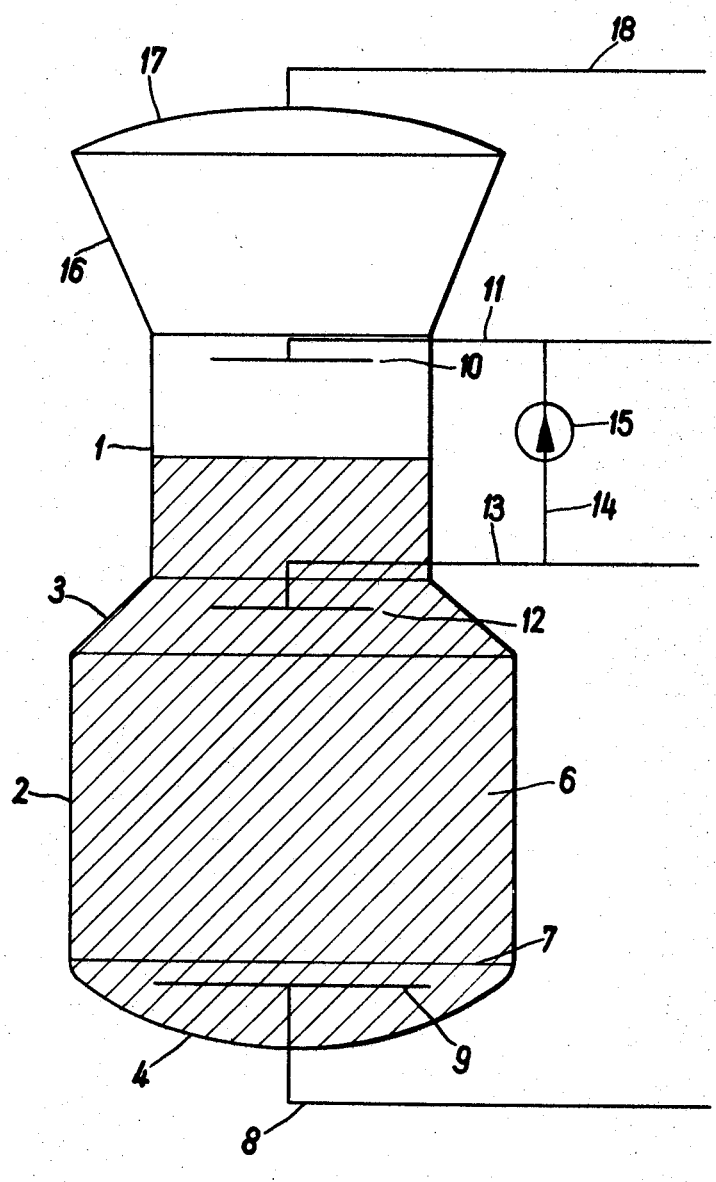

ABSTRACT OF THE DISCLOSURE

A liquid treating apparatus is composed of a lower cylindrical portion, an upper cylindrical portion of less diameter than said lower portion, and a conically shaped intermediate portion. Adsorption or ion exchange material fills the lower and intermediate portions and not more than half the upper portion. Liquid is fed both through the bottom portion and on top of the material in the upper portion, and drained from the intermediate portion.

---

This invention relates to an apparatus for treating liquids with adsorption media or ion exchange materials which form a stationary granular layer in a housing.

Both adsorption material and ion exchange material have the common feature that they can be charged with adsorbed substances or with ions exchanged from the liquid to be treated up to their saturation condition and subsequently can be regenerated by the use of suitable solvents or solutions so as to be returned to their original active condition and thus be reusable. The adsorbed material and/or ions exchanged can be recovered from the regenerating liquid.

An apparatus for liquid treatment by adsorption or ion exchange contains the adsorption material or ion exchange material as a granular stationary layer and is operated like a granular filter bed in such a way that the regenerating liquid is moved through the granular layer in a direction which is opposite to the flow of the raw liquid being treated.

It is preferred that the raw liquid being treated flows from the top toward the bottom through the granular material while the regenerating liquid flows from the bottom up through the granular material. This corresponds to the operation of mechanical filters for filtration and backwash whereby, during backwash, the solid material which has been separated in the filter bed is rinsed out along the same path it entered while at the same time the filter bed is loosened.

During the regeneration of undisturbed granular layers of adsorption material or ion exchange material, the basic principle is to move the regenerating liquid through the granular material in the same direction as the raw liquid and this is the most often used procedure.

In this case, this means that the raw liquid as well as the regenerating liquid moves through the granular layer from the top toward the bottom.

When the granular material has reached a breakthrough load condition, then its capacity is completely exhausted on the side the raw liquid enters while an incomplete saturation remains in the discharge side of the material.

If, at this time, the regenerating liquid is also moved through the granular layer from the top toward the bottom, then the eluted matter or ions must be completely discharged from the complete saturation ranges through the incomplete saturation range and out of the granular layer. This causes a large consumption of regenerating material, which in ion exchangers, amounts to three times the theoretical requirement.

If, on the other hand, the regenerating liquid is moved through the granular layer in a direction opposite to the flow of the raw liquid, in the present case from the bottom toward the top, then the eluted materials, just as in the case of the backwash in mechanical filters, are discharged from the granular layer in the same way in which they were introduced.

The consumption of regenerating material in this procedure is only slightly greater than the theoretical requirement. However, this is only true under the supposition that the granular layer is not disturbed or stirred and the layers are not relocated by the upward movement of the regenerating liquid. Adsorption material and ion exchange material usually are specifically light materials which start to float at low upwardly moving flow velocities.

However, the granular layers in mechanical filters which usually consist of specifically heavy particles are only fluffed up but not redistributed during flow velocities which are necessary for the discharge of the filtered solid material from the granular layer during backwashing and the height of the layer is slightly raised during this process. In filters containing an activated carbon, it is known to retain the activated carbon between screens which permit the flow of liquid through the activated carbon so that, during the upward flow of liquid, the activated carbon is prevented from being loosened and expanded. Since the mesh size of the bottom screen must be smaller than the smallest fraction of the activated coal particles, these screens have a high flow resistance and cause a correspondingly high pressure loss.

This way of tightly packing the adsorption layer between two screens which permit the passage of liquid can then only be used when the adsorption material does not have a change of volume dependent on loading conditions.

However, in most adsorption and ion exchange material layers, a change in loading conditions also causes a change in the loose weight volume. In some ion exchangers, this volume change can amount up to 20%.

German Pat. No. 832,596 discloses a housing for granular filter material, adsorption material and ion exchange material formed in a quiet stationary layer in which the granules lie on a bottom surface composed of material permitting the passage of liquid and which is held on the top surface by a screen slidably mounted in the housing so as to be vertically displaceable. Even this type of screen has such a high flow resistance as to be disadvantageous. Another disadvantage is that these screens must be quite accurately guided in the housing in order to prevent the escape of filter material around the periphery of the screen. Thus this type of screen quite easily gets hung up because of uneven edges and thus does not fulfill its object.

Such a screen also has the disadvantage in that it does not permit a backwash of the granular material because, on one hand, the flow velocity of the rinsing liquid is limited and, on the other hand, they resist the expansion of the granular material in the upward direction. Attempts have been made to at least prevent the swirling and repositioning of the granular layer in the upward flow by inserting large mesh screens or baffle plates at various levels across the cross-section of the housing.

Such measures, however, enhance the formation of hollow spaces in the granular layer and permit a liquid breakthrough. The cross-sectional area cannot have a guaranteed uniform cross-sectional loading.

British Pat. No. 806,107 discloses an ion exchanger with a floating layer of exchange material through which the liquid flows from top to bottom during charging and from bottom to top during regeneration.

An auxiliary liquid is introduced during the regeneration step into the free space above the exchange material layer and is combined with the upwardly moving regenerating liquid and discharged from the side of the housing by means of a collecting device. With this apparatus, it is also not possible to prevent swirling and repositioning of the ion exchange material during the upward flow of the liquid through the material.

In a heretofore unavailable disclosure, as expressed in German patent application M 48,866, it was proposed that the auxiliary liquid introduced into the free space above the exchange material layer be combined within the bed of granular exchange material with the liquid rising through the bed and to discharge the mixture of liquids through a drainage system embedded in the exchange material and having its outlet on the side of the housing.

This invention is directed to an improved apparatus for accomplishing the aforesaid method.

The object of this invention is to produce an apparatus for the treatment of liquids with adsorption material or ion exchange material, which material is formed as a granular layer within a housing and resting on a supporting surface which permits the passage of liquid. The raw water liquid and the regenerating liquid flow through the material in opposite directions. An auxiliary liquid is introduced into the free space above the granular material during the upward flow of the liquid introduced through the bottom, and this auxiliary liquid is combined in the uppermost zone of the granular material with the upwardly directed liquid flow and is discharged from the apparatus by means of a drainage system embedded in the material.

The apparatus of this invention is composed of a housing consisting of two cylindrical portions having different diameters with the upper and lower portion being connected with the lower wider portion by means of an intermediate member having the shape of an obtuse cone. At the joint level where the intermediate member joins the upper portion or just slightly below this is a conventional drainage system which is connected with a drain line that goes out through the side of the housing. Exchange material fills the upper narrow portion to not more than one-half its height. A further feature resides in the provision of a top housing portion which diverges outwardly and upwardly, joined to the upper end of the upper housing portion of the apparatus.

The granular material in the upper portion of the housing above the drainage system can be composed of an adsorption material or ion exchange material with which all the housing is filled or it can be composed of another, for example, an inert granular material. The liquid which is discharged through the side of the housing through the drainage system can be used as the auxiliary liquid. This is done by means of a circulatory system maintained by a pump between the side wall drain pipe and the top of the upper portion. On the other hand, a different type of a suitable liquid can be introduced through the upper pipe connection as the auxiliary liquid, either exclusively or as a mixture with a liquid that has been taken from the drain on the side of the housing.

The ratio of the cross-section between the upper and lower portions can amount to from 1:2 to 1:5. The ratio of the depth of the material in both portions lies preferably between 2:1 and 1:5. The ratio of the quantity of granular material contained in both portions can thus amount to 1:1 up to 1:25. The height of the intermediate portion is in the form of an obtuse cone having an angle of inclination of about 30 to 60°.

Because of the granular material contained in the upper narrow portion of the housing, a pressure is exerted onto the total amount of granular material in the housing and with the use of a comparatively small amount of auxiliary liquid which effectively prevents a stirring of the material and a dislocation of the layer of material.

This makes it possible to use for the lower portion of the housing a larger diameter than had heretofore been possible for a method in which the operating liquids are moving partially upwardly and downwardly through the granular material.

The means by which the objects of the invention are obtained are described more fully with reference to the accompanying schematic drawings in which:

FIG. 1 is a cross-sectional view through the apparatus of this invention; and

FIG. 2 is a similar view of a modified form of the invention.

The housing of the apparatus is composed of an upper narrow portion 1 and a lower wider portion 2. These two portions are joined by a conically shaped intermediate portion 3 which, in the example given, has an angle of inclination of approximately 45°. The housing is completed by a bottom 4 and a cover 5.

A granular layer 6 composed of adsorption material or ion exchange material rests on bottom 4. It can also rest on a perforated plate mounted at the level of the bottom flange 7. The pipe 8 extends into the granular material and is connected to a distribution system 9. However, if a perforated bottom is used, the distribution system 9 is eliminated and pipe 8 ends in the chamber beneath the perforated plate.

A pipe 11 extends through cover 5 and ends in a distribution system 10 in a space above the upper level of the material 6.

A drainage system 12 is embedded in the granular material approximately at the joint level between the intermediate portion 3 and the upper narrow portion 1 and is connected to a drain pipe 13 extending outwardly through the side of the housing. The drain pipe 13 is connected to the pipe 11 by means of a pipe 14 which goes through a pump 15. This is for the purpose of being able to recycle a portion of the drained liquid in pipe 13 as an auxiliary liquid into pipe 11 and supplied into the free space above the granular material.

The adsorption of components from liquids and their desorption by means of another liquid, as well as the process of using and regenerating ion exchange material, are reversible processes in which the regeneration step represents the reverse of the charging step.

Consequently, it is possible to carry out the charging as well as the regenerating with a liquid flow that moves from the top toward the bottom of the housing.

If the charging is accomplished during upward liquid flow, then preferably as auxiliary liquid, it is preferred to use a portion of the treated liquid removed through pipe 13 and sent to pipe 11 through pipe 14 and pump 15 and diverted so that the treated liquid is not diluted by the foreign auxiliary liquid. In this case, the pressure required for settling the ion exchange material is produced by the flow velocity of the recycled partial stream of treated liquid.

Regenerating liquid is then supplied through pipe 11 and distributing system 10 and discharged through the bottom pipe 8. The rinsing liquid for removing the treatment liquid from the granulated layer is most appropriately accomplished in the same direction in which the raw liquid to be treated was introduced through the granular layer during the preceding operation step.

If the raw liquid is introduced into the adsorption or ion exchange material in the generally preferred downward flow, then the uppermost layer of the granular material can also function as a mechanical filter.

Since the adsorption capacity and/or the ion exchange capacity of this uppermost layer is completely used in each case, it is possible to remove the auxiliary liquid during regeneration, either completely or partially from the regeneration step and to recycle the same through the circulatory system.

The granular material above the drainage system 12 can be cleanly rinsed from impurities that may have entered by the backwashing water, for example, is introduced for this purpose through pipe 13 and drainage system 12 and removed through the upper pipe 11. Pipe 14 in this case is closed and pipe 8 is also closed. During this backwashing, the fact that the granular material above drainage system 12 is activated and relocated is not a disadvantage and without significance because the capacity of this material is in every case completely exhausted during the charging occurring on the downward flow.

However, even a suitable inert material can be used for the granular material above drainage system 12 and which is specifically lighter and/or of finer particles than the remaining amount of adsorption or ion exchange material. Suitable inert materials are, for example, synthetic resin granules, granulated carbon or the like.

When the apparatus has been in operation for a long time, stoppages and/or breakthrough channels or passages are formed in the granular material so that it becomes necessary to rinse, fluff or loosen the granular material. If a loosening and rinsing of only that part of the granular material which lies above the center drainage system is to be done then as heretofore mentioned, this is accomplished by introducing the cleaning liquid through the drainage system 12 and removing it through the upper pipe 11. A backwashing and loosening of the material below the drainage system 12 which is required at certain time intervals, especially during the introducing of raw liquid from the bottom toward the top, is accomplished in such a way that no particles of the granular material are discharged from the apparatus with the cleaning liquid.

Such a reliable and safely operable backwashing and loosening is possible without the need for additional containers and/or additional changes such as are required for apparatus hitherto used. The liquid used for cleaning and fluffing is introduced through the lower liquid distribution system 9 and is removed completely or partially through the middle drainage system 12. If a fluffing and cleaning of the entire contents of the housing is necessary, then only a portion of the cleaning liquid is removed through the middle drainage system 12 and the remaining portion removed through the upper pipe 11. The two partial streams removed through the middle drainage system 12 and the upper pipe 11 are, in this case, most appropriately adjusted so that approximately the same flow velocities occur in the lower and upper cylindrical portions of the housing. In this manner, this invention achieves that the granular material which must be cleaned is uniformly fluffed. The material in the lower cylindrical portion expands thereby into the upper smaller cylindrical portion. The free volume required for the expansion in the lower portion must be measured according to the volume expansion occurring during the cleaning and fluffing of the material.

Even when the granular material above the drainage system 12 is composed of an inert material, this backwashing and fluffing of the material is possible. In this case, there is no danger in this invention that there will be a relocation and/or mixing of inert material and ion exchange material or adsorption material.

It is possible that the volume expands approximately 30% during the cleaning of cation exchange material. In this case, it is desirable to mount an additional top housing portion on the upper end of the upper portion of the housing, which added portion diverges upwardly to form a space into which the granular material can expand during rinsing.

Preferably this top housing portion is in the form of an upwardly opening cone having an angle of inclination of about 30 to 60°.

This form of the invention is shown in FIG. 2.

The elements 1 to 15 in FIG. 2 are the same as those in FIG. 1. Added to the construction of FIG. 1 is the top housing portion 16 which diverges upwardly and is closed by a curved cover 17. Top housing portion 16 is cone shaped diverging upwardly and is joined to the upper portion 1 approximately at the level of the upper liquid distribution and/or liquid collecting system 10. Pipe 18 extends through cover 17 and is used for the introduction and/or draining of the backwashing liquid.

It is also possible to position the system 10 within the top housing portion 16 and to connect it to pipe 18. Pipe 11 is then eliminated. Pipe 13 can then be connected by means of pipe 14 going through pump 15 to pipe 18. Top housing portion 16 is generally attached to a level of upper portion 1 so that the joint is above the surface of the loose weight material in portion 1.

Liquid flows through the adsorption or ion exchange material as in the opposite direction during charging and regenerating as in FIG. 1. At this point, and for the duration of the upward flow through system 10, a flow of auxiliary liquid is introduced which is downwardly directed and removed together with the liquid introduced through pipe 8 by way of drainage system 12. A portion of the treated liquid removed through pipe 13 is recycled as auxiliary liquid during charging in upward flow through pipes 14 and 11 so that a dilution of the treated liquid by foreign auxiliary liquid is prevented. The rinsing and fluffing which is necessary from time to time is done by rinsing liquid supplied to pipe 8 and is removed either partially or completely through drainage system 12. The granular material which expands during rinsing moves upwardly into top housing portion 16. Rinsing liquid not removed through drainage system 12 is removed through pipe 18. With this manner of operation, it is even possible to control the two partial streams which move through pipes 13 and 18 in such a way that identical flow velocities occur in the material in both portions 1 and 2 of the housing.

EXAMPLE

In the following comparative example, raw water is debased in a strongly acid cation exchanger and finally put through a strongly basic anion exchanger. The composition of the raw water included:

Total salt content—10.5 meg./liter [1]
Strong acid anions—6.5 meg./liter
Weak acid anions—4.0 meg./liter
Total hardness—5.8 (55% cations)

[1] Means milliequivalent per liter.

In three comparative tests, 358 liters of cation exchange material was charged with this water in downward flow up to the breakthrough of 45 to 50 m.³ of raw water, and the debased water running off was moved through an anion exchange material which is fully regenerated for each test.

For the first test, the cation exchange material was put in a housing as shown in FIG. 1 having a lower portion of 1000 mm. in height and 600 mm. diameter, a cylindrical upper portion of 1000 mm. in height and 400 mm. in diameter and a conical intermediate portion having a height of 1000 mm. and an angle of inclination of 45°. The cation exchange material filled the housing to the extent that the height of the material in upper portion 1 was 400 mm. The drainage system 12 was positioned in the material adjacent the upper end of part 3 and pipe 13 extended through the side of the housing.

For the other two tests, the cation exchange material was placed in a cylindrical housing 2000 mm. high and having a uniform diameter of 600 mm. A drainage system was placed in the ion exchange material 100 mm. above the bottom of the housing and connected to a pipe extending through the side of the housing.

During the first comparative test, the cation exchange material in the housing of FIG. 1 was regenerated during the downward flow of raw water up to breakthrough with an upward flow of hydrochloric acid. 63.9 kg. of commercial (33%) hydrochloric acid was diluted for this purpose to approximately 200 liters and put through the exchange material from bottom toward top. After that, the used regenerating liquid was upwardly displaced by water flowing through the exchange material at a velocity of 3.9 m.³/h. and was rinsed out.

In order to prevent agitation and redistribution of the exchange material, a partial stream of 1.3 m.³/h. of the regenerating drainage and the drainage of the cleaning water was used as auxiliary liquid cycled through the top of the housing, the pipe 13 and the pipe 14, whereby a downwardly directed flow of liquid existed in the upper part of the housing. The cation exchange material, after this regeneration and rinsing, was again charged with raw water up to the breakthrough and the water being drained off was passed over the anion exchange material. The desalted water had a conductivity of $1.9 \cdot 10^{-6}$ mhos per cm. From the volume of raw water thus obtained there resulted a usable volume of cation exchange material of 1.39 gram equivalent per liter of exchange material.

In the second test, the same amount of exchange material was placed in the cylindrical housing having a constant cross-section. The cation exchange material which was charged up to breakthrough was again diluted with a 63.9 kg. of 33% hydrochloric acid to about 200 liters, regenerated in the upward flow and washed with rinsing water having a flow velocity of 3.9 m.³/h. The circulatory flow directed downwardly in the upper part of the housing had to have a flow velocity of 4.4 m.³/h. in order to prevent agitation and redistribution of the exchange material. The water after this regeneration in the cation exchange material and the subsequent passage over the anion exchange material had a conductivity of $2.6 \cdot 10^{-6}$ mhos/cm. From the volume of raw water obtained, there resulted a usable capacity of volume of the cation exchange material 1.36 gram equivalents per liter of exchange material.

For the third test, the cation exchange material was placed in a cylindrical housing having a uniform cross-section and was regenerated and rinsed in downward flow by the regenerating liquid and the rinsing liquid.

In order to obtain approximately the same capacity as was obtained in the first two examples, 127.8 kg. of hydrochloric acid of commercial quality was diluted to about 400 liters and used for the regeneration.

After treating raw water on the regenerated cation exchange material and the following anion exchange material, the desalted water running off had a conductivity of $13.10^{-6}$ mhos/cm. From the volume of raw water, there resulted a usable capacity of volume of cation exchange material of 1.46 gram equivalents per liter of cation exchange material. The result of these three tests are combined in the following table.

| Example | 1 | 2 | 3 |
| --- | --- | --- | --- |
| Amount of exchange material in liters | 355 | 355 | 355 |
| Regenerating liquid per cycle 33% hydrochloric acid, kg | 63.6 | 63.6 | 127.8 |
| Auxiliary liquid circulation, m.³/h | 1.3 | 4.4 | |
| Usable volume capacity, gram equivalents per liter | 1.39 | 1.36 | 1.46 |
| Quality of Water-Conductivity in mhos/cm. ×10⁻³ | 1.9 | 2.6 | 13.0 |

This table shows that in an ion exchange material charged with downward flow of the material required for regeneration in the upward flow is only half as much as for regeneration in downward flow, that in the apparatus of this invention, as opposed to the apparatus having a housing of constant cross-section, it was possible to obtain a water of higher quality with a substantially lower amount of auxiliary liquid, and finally that regenerating in a direction flowing opposite to that of the charging liquid with regard to the requirement for regenerating material and auxiliary liquid and also with regard to the quality of water obtained is considerably better than when the direction of flow for charging and regeneration are the same, as in Example 3.

Having now described the means by which the objects of the invention are obtained, I claim:

1. In an apparatus for treating liquids with a material comprising a housing, granular treatment material in said housing, means for introducing a first liquid upwardly through said material, means (10) for introducing an auxiliary liquid on the top of said material, and drainage means (12) for removing a mixture of said first liquid and said auxiliary liquid from within said material, the improvement comprising a lower cylindrical housing portion, an upper cylindrical housing portion of less diameter than said lower portion, an intermediate housing portion joining said lower portion to said upper portion, said material filling said lower portion, intermediate portion and not more than one-half of said upper portion, said drainage means being located in said intermediate portion no higher than the joint between said intermediate portion and said upper portion, and pump means interconnected between said drainage means and said means for introducing an auxiliary liquid to remove part of the liquid from the drainage means and feed it to the means for introducing an auxiliary liquid.

2. In an apparatus as in claim 1, further comprising the ratio of diameters of said upper portion to said lower portion being from 1:2 to 1:5.

3. In an apparatus as in claim 2, further comprising the ratio of the depth of the material in said upper portion to said lower portion being from 2:1 to 1:5.

4. In an apparatus as in claim 3, said intermediate portion being in the shape of an obtuse cone having an angle of inclination of from about 30 to 60°.

5. In an apparatus as in claim 4, further comprising an upwardly and outwardly diverging top housing portion mounted on said upper portion.

6. In an apparatus as in claim 5, said top housing portion being above the loose bulk of the material in said upper portion.

7. In an apparatus as in claim 6, said top housing portion being in the shape of an inverted cone.

8. In an apparatus as in claim 7, said inverted cone having an angle of inclination of from about 30 to 60°.

9. In an apparatus as in claim 8, further comprising a cover on said top housing portion, and pipe means (18) extending through said cover for the passage of cleaning liquid into and out of said top housing portion.

10. In an apparatus as in claim 9, further comprising liquid distribution and drainage means (10) mounted in said upper portion above the material therein.

11. In an apparatus as in claim 9, further comprising liquid distribution and drainage means (10) mounted in said top housing portion.

12. In an apparatus as in claim 1, said pump means producing the same velocity of liquid flow in said upper portion and said lower portion of the housing.

References Cited

UNITED STATES PATENTS

| 1,942,807 | 1/1934 | Dotterweich | 210—279 X |
| 2,684,729 | 7/1954 | Berg | 55—79 X |
| 3,415,377 | 12/1968 | Higgins | 210—268 X |

FOREIGN PATENTS

| 584,169 | 10/1957 | Canada. |
| 806,107 | 12/1958 | Great Britain. |

SAMIH N. ZAHARNA, Primary Examiner

U.S. Cl. X.R.

210—290